UNITED STATES PATENT OFFICE.

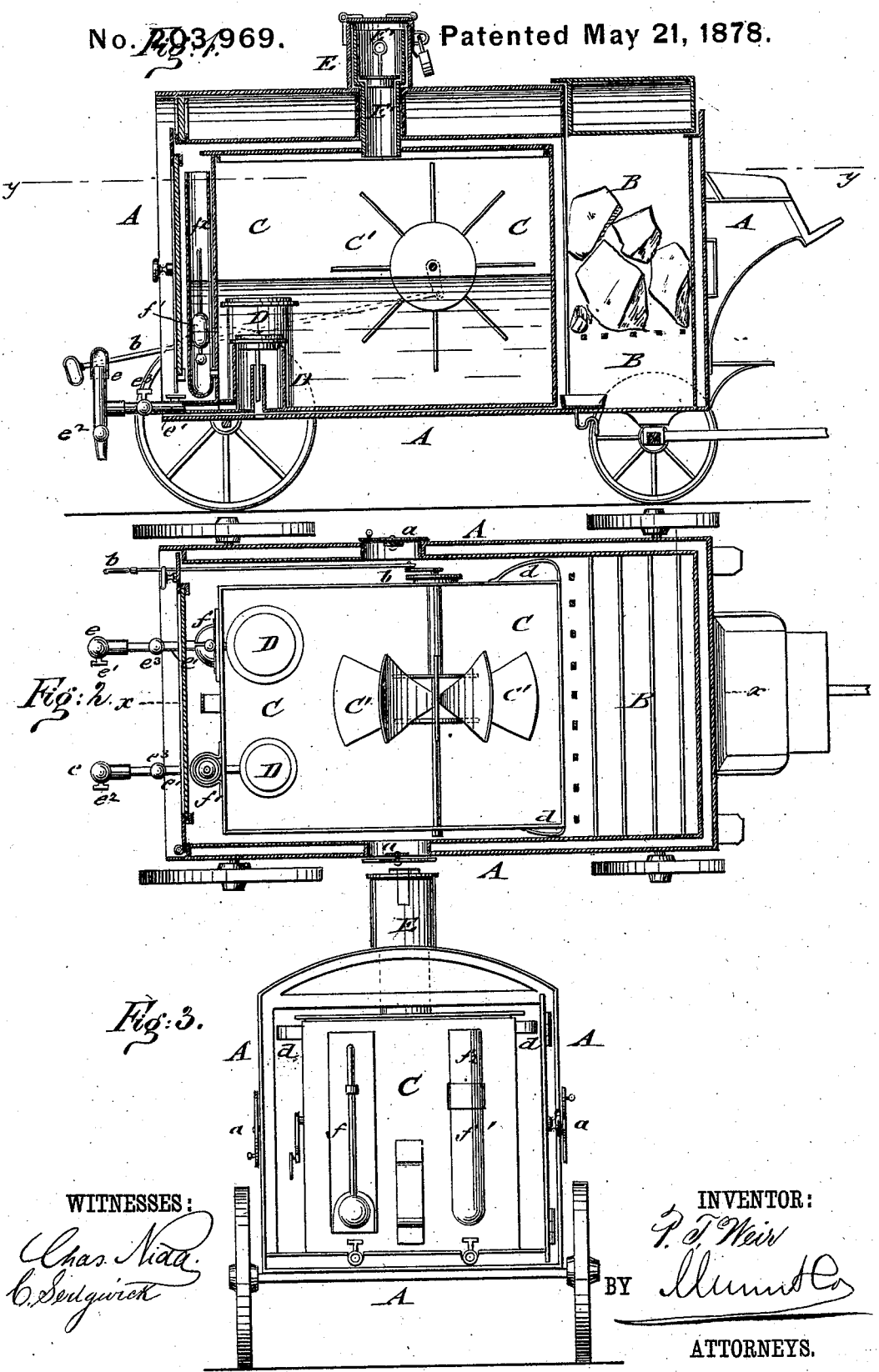

PATRICK T. WEIR, OF NEW YORK, N. Y.

IMPROVEMENT IN MEASURING ATTACHMENTS FOR REFRIGERATING MILK-WAGONS.

Specification forming part of Letters Patent No. 203,969, dated May 21, 1878; application filed January 25, 1878.

*To all whom it may concern:*

Be it known that I, PATRICK T. WEIR, of the city, county, and State of New York, have invented a new and Improved Refrigerating Milk-Wagon, of which the following is a specification:

In the accompanying drawing, Figure 1 represents a vertical longitudinal section on line $x\ x$, Fig. 2; Fig. 2, a horizontal section on line $y\ y$, Fig. 1; and Fig. 3, a rear elevation of my improved refrigerating milk-wagon.

Similar letters of reference indicate corresponding parts.

The object of this invention is to furnish, for the purpose of delivering milk in cities, improved measures for a refrigerating milk-wagon.

Referring to the drawing, A represents a wagon provided with an interior ice-chamber, B. At the inside of the refrigerating-wagon is placed a large milk-tank, C, that contains a certain quantity of milk, which tank is provided with a suitable stirrer-wheel, C'.

The milk-tank is provided at the interior with measuring devices D, at or near the bottom, for drawing off quarts, pints, &c., the measure having valved tops, which are operated by a suitable key inserted through the bottom, as shown in Fig. 1, or by lever-rods, or in other manner.

By raising the valved tops the measures are quickly filled, the quantity being indicated by glass gages $e$ at the upper end of the discharge-faucets.

The milk passes from the measures D, through exit-tubes $e^1$, to the outside, the tubes having vertical end pipes with bottom faucets $e^2$ and intermediate stop-cocks $e^3$, that are opened when the measures are to be filled, so that the milk can rise into the gage, but which are closed after the same is drawn off, to prevent freezing in cold weather, or souring in warm weather.

At the top of the refrigerating-wagon is an opening surrounded by a tubular casing, E, that passes through the double wall of the wagon, and has an interior shoulder, on which a measuring-vessel, E', with valve, is seated. The measuring-vessel E' is extended downward and fitted into an opening in the cover of the tank. The measuring-vessel serves to measure the milk as the same is transferred to the tank, the valve being lifted whenever the upper measuring part of the vessel E' is filled, so as to drop the milk into the tank. When the tank is full, the lid of the top casing E is closed.

What I claim is—

1. The combination, with the casing E on top of wagon, and connected by an opening with the milk-tank, of the measure E', offset at the middle to rest on shoulder of casing, and divided by a valve into an upper measure and a lower discharge-spout, as shown and described.

2. The bottom measure D, having a top valve with subjacent stem, guided in a central socket, and a discharge-spout with gage and stop-cock on the outside, as shown and described.

PATRICK T. WEIR.

Witnesses:
PAUL GOEPEL,
C. SEDGWICK.